Dec. 19, 1944.  R. H. PREWITT  2,365,357
AIRCRAFT HAVING ROTATING BLADES OR WINGS
Filed Dec. 18, 1940  3 Sheets-Sheet 1
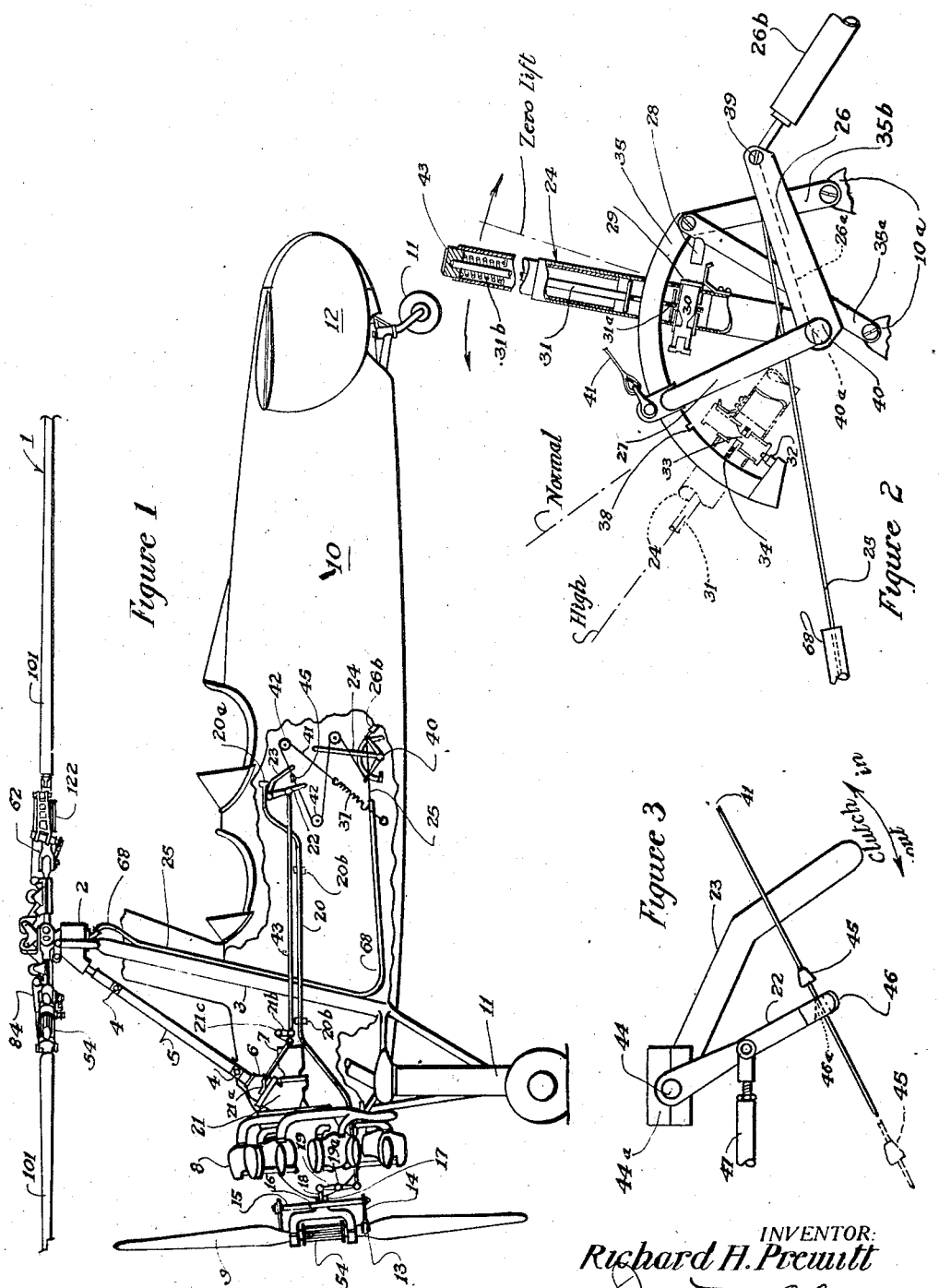
INVENTOR:
Richard H. Prewitt
BY James N. Clark
HIS PATENT ATTORNEY.

Dec. 19, 1944.   R. H. PREWITT   2,365,357
AIRCRAFT HAVING ROTATING BLADES OR WINGS
Filed Dec. 18, 1940   3 Sheets-Sheet 2

INVENTOR:
Richard H. Prewitt
BY
HIS PATENT ATTORNEY

Dec. 19, 1944.   R. H. PREWITT   2,365,357
AIRCRAFT HAVING ROTATING BLADES OR WINGS
Filed Dec. 18, 1940   3 Sheets-Sheet 3
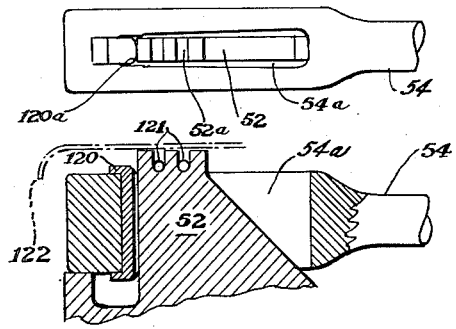
Figure 10
Figure 9
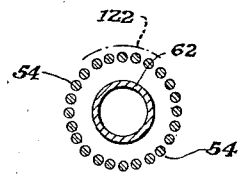
Figure 8
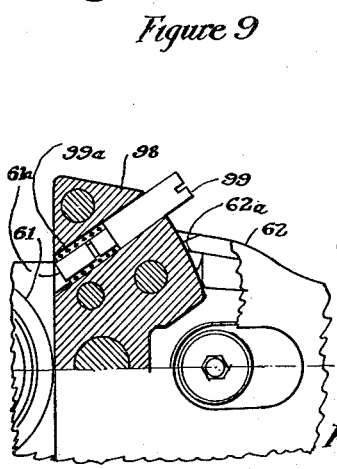
Figure 11
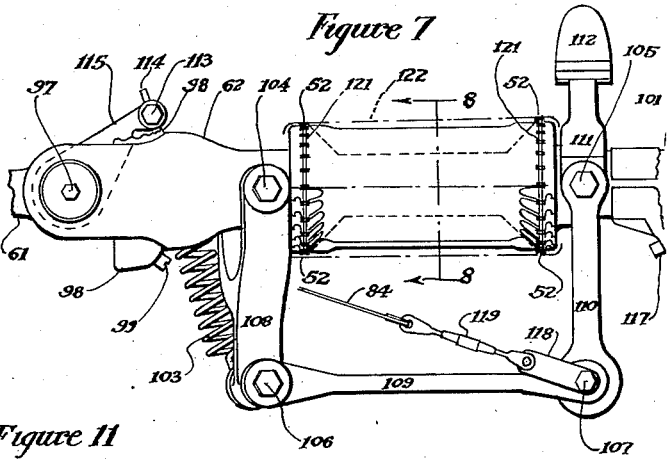
Figure 7
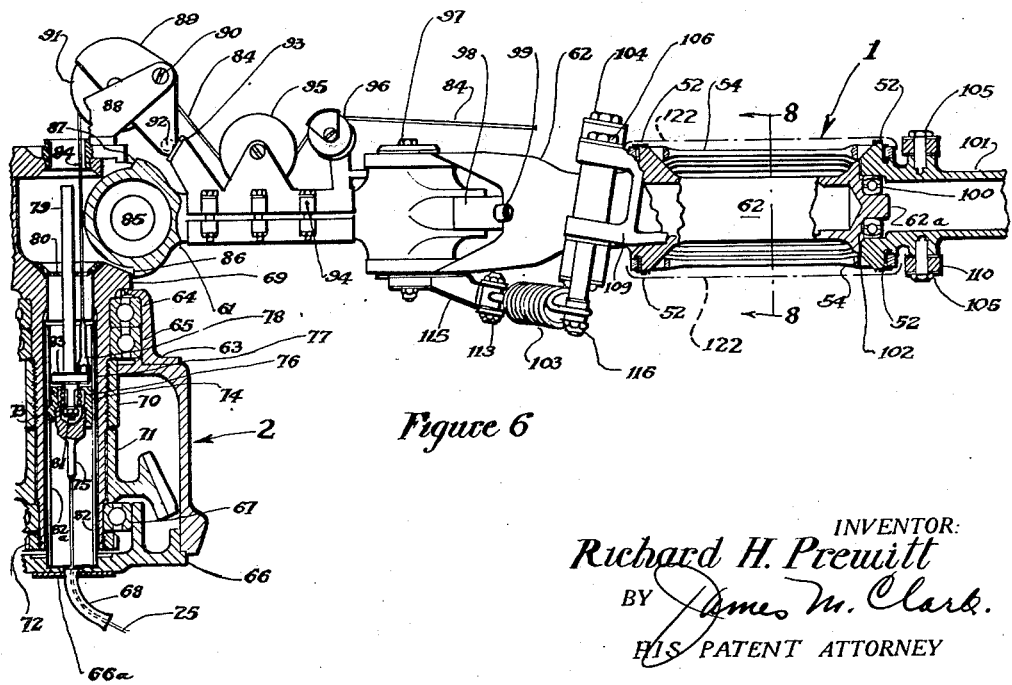
Figure 6
INVENTOR:
Richard H. Prewitt
BY James M. Clark
HIS PATENT ATTORNEY Patented Dec. 19, 1944

2,365,357

UNITED STATES PATENT OFFICE 2,365,357

AIRCRAFT HAVING ROTATING BLADES OR WINGS

Richard H. Prewitt, Lansdowne, Pa., assignor to Kellett Aircraft Corporation, a corporation of Delaware Application December 18, 1940, Serial No. 370,572

6 Claims. (Cl. 244—17)

The present invention relates to aircraft and more particularly to improvements in the mounting of the blades of propellers and rotor systems and means for adjusting the blade pitch of the same. This invention is further concerned with improvements in the mounting details of the blades and their construction for the purposes of reducing weight and friction and also to automatic interconnections between the blade pitch and drive mechanism controls of rotative wing aircraft of the jump take-off type.

One of the major objects of the present invention is the provision of means for controlling the incidence angles of rotating blades of either horizontal or vertical thrust propellers, or the rotating wing systems of autogiros. A further object is the provision of such wings which are operated under conditions of centrifugal tension without involving excessive friction and to further improve such devices by the simplification and elimination of parts heretofore found necessary and to thereby provide structures which are lighter in weight. It is a further object of the invention to provide both manual and automatic means for controlling the pitch angle of propellers and/or rotor blades while they are in operation. A further object contemplates a novel cable control arrangement for the actuation of the blade pitch changing mechanism. Among the other objects of the present invention is the provision of a self-centering stop ararngement which may be adjusted to permit blade folding and an interconnection between the pitch change control system and the jump take-off clutch control whereby the latter is automatically tripped when the blade pitch is manually adjusted into the high lift position.

Other objects and advantages of the present invention may occur to those skilled in this art after a reading of the following description and the accompanying drawings forming a part hereof, in which;

Fig. 1 shows an elevation of an aircraft of the rotating wing type incorporating a tractor propeller and rotor system with a portion of the fuselage broken away to show the blade pitch control mechanism;

Fig. 2 is a detail drawing showing the operating lever for manual and/or automatic control of the blade pitch angles;

Fig. 3 shows a detail of the automatic clutch releasing device;

Fig. 6 shows an elevation and partial sectional view of the hub and blade mounting assembly illustrating the method of varying the pitch angle of the blade;

Fig. 7 is a plan view of the mechanism at the hub end of the rotor blade as used for controlling its pitch angle;

Fig. 8 is a sectional view through the pitch angle controlling mechanism taken along the lines 8—8 of Figs. 6 and 7;

Figs. 9 and 10 show views of an end of the tension-torsion rods shown in Fig. 6; and Fig. 11 is a detail view of one of the retractable blade stops.

Figure 4:
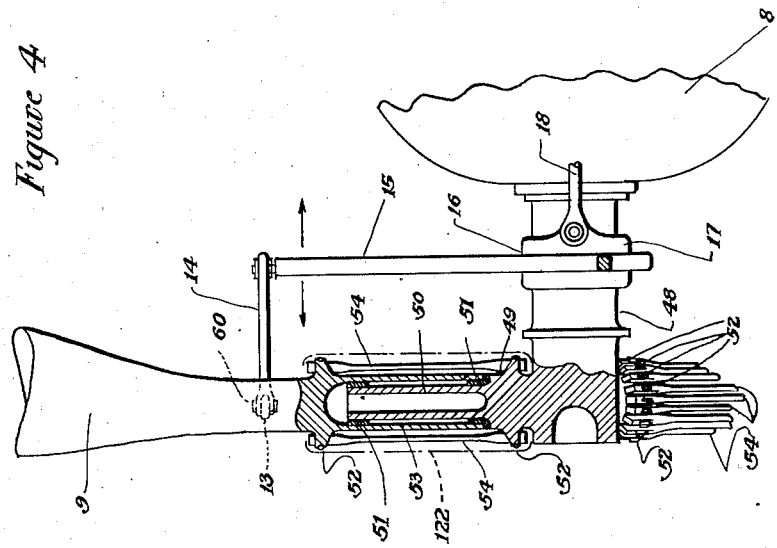
Fig. 4 shows an installation of the propeller blade pitch angle control device applied to a three-bladed tractor propeller.

Referring to Fig. 1, there is shown an elevational view of an aircraft of the rotating wing type provided for jump take-off, in which the general arrangement of the present invention is outlined. The aircraft 10 is comprised of the rotor system 1 composed in the present instance of three rotatable blades, mounted upon the hub 2 and supported from the fuselage of the aircraft by the pylon 3. The rotor system 1 is arranged to be selectively driven through the universal joints 4 and the drive shaft 5 by the rotor starter 6, and the engine 8, having an engine starter 7, the engine also being arranged for the drive of the tractor propeller 9. The aircraft is otherwise provided with the usual landing gear 11 and tail surfaces 12 conventionally found on this type aircraft.

Figure 5:
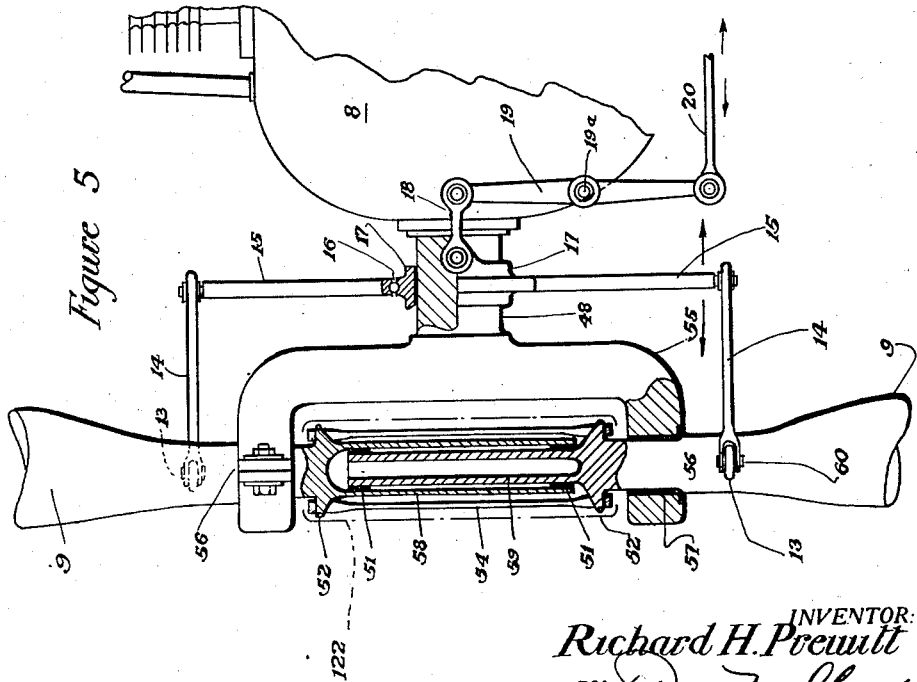
Fig. 5 shows the application of the device to a two-bladed controllable pitch propeller.

The tractor propeller is of the controllable pitch type, the blade pitch being controlled through the lugs 13 mounted on each blade and pivotally connected to the links 14, the radially extending arms 15 journalled on bearing 16, and the slidable collar 17, all as more clearly shown in Fig. 5. The collar 17 is pivotally connected to a link 18 and the bellcrank 19 pivotally mounted upon the engine at 19a and having its opposite terminal pivotally connected to the control rod 20 guided by the bearings 20b and terminating with a control handle 20a in the cockpit of the airplane accessible to the pilot. The clutch 21 which has been indicated in the drawing is of the external band type, but may be of any other suitable construction, and is controlled through suitable arms 21a, the push pull tubes 43, which are pivotaly interconnected to the bellcranks 21b pivoted at 21c and terminating in the arm 22, and the manually operated handle 23 which will be subsequently described more fully.

Referring now to Fig. 2, there is shown the arrangement of the handle lever 24 and cable 25 by which the rotor blade pitch angles are controlled. The control lever 24 is attached through a torque shaft 40 to levers 26 and 27 and suitably journalled and supported by brackets 35a and 35b from the fittings 10a on the aircraft structure, being so arranged that when lever 24 is pulled back against the stop 28 the slidable plunger 29 is moved forward so that its large circular section at 30 substantially fills the hole in the tongue 31a in the plunger 31. It should also be noted that when the lever is in the forward position the opposed stop 32 causes the plunger 29 to move back so that the small diameter of the plunger shown at 33 permits the plunger 31 to move up so that its upper face 34 comes against the lower edge of the quadrant 35 as shown in dotted lines in Fig. 2. The spring 31b in the upper end of the control tubular handle 24 will tend to keep the plunger 34 against the quadrant 35 when the control lever 24 moves up and back due to the force of the spring 37 (Fig. 1) acting on lever 27 through cable 41 which runs over pulleys 42, in combination with automatic control means rotating in the rotor head. As the control lever 24 moves back along the quadrant 35 the spring 31b will force the upper edge 34 of the plunger 31 into notch 38 which represents the pitch angles of the rotor blades 1 in normal flight. Hand button 43 fixed to the plunger rod 31 provides a means of releasing the lever 24 from its latched position in which the tongue 31a engages the notch. When the lever is back against the stop 28 the blades are in low pitch and when it is down against the stop 32 the blades are in high pitch. When lever 24 is pulled further aft than shown the terminal 39 of lever 26 moves downward about the pivot 40 of the levers 24, 26 and 27 thereby pulling cable 25 downwardly and rearwardly in relation to pivot 40. Lever 26 is slotted in its upper section at 26a and pivot shaft 40 is recessed at 40a directly under cable 25, such that when the point 39 is lowered sufficiently so that the line of cable 25 passes below the pivot 40, the tension in cable 25 due to forces acting on the hub-end of said cable in combination with tension in cable 41 due to spring 37 will tend to keep lever 24 in the rear position against stop 28.

Fig. 3 shows a detail of the clutch operating lever. Hand lever 23 is connected to lever 22 through a torque shaft 44, journalled in the bearing block 44a carried by the airplane structure, both levers being displaced laterally as indicated by cable 41 passing lever 23 on the near side of the reader, therefore, levers 22 and 23 move together about pivot 44 transmitting the engaging load to push-pull rod 47. The lower end of 22 is formed into two open end lips 46 straddling the cable 41 on which there is located a fixed stop 45. The purpose of the stop is to automatically disengage the rotor clutch 21 when the pitch control lever 24 is moved from low pitch to high pitch thereby preventing the possibility of a jump take-off with the rotor clutch engaged. It will be noted that the fixed stop 45 on cable 41 is conical in shape and that an internal portion 46a of the fork lips on lever 22 is sloped. The purpose of this arrangement is to permit conical stop 45 to move upward and to the right through fork arm 46 of lever 22 without creating any appreciable force on the end of lever 22. However, when stop 45 is moved downward in the opposite direction it will engage the fork end 46 of lever 22 as described.

Referring to Fig. 4, the nose of the engine is shown at 8 with the propeller shaft at 48 carrying either two or three radially extending stub arms 49 (Fig. 4 indicates a three-bladed propeller and a two-bladed system is shown in Fig. 5). The radial stub arms 49 are machined cylindrically at 50 upon which are mounted bearings 51 at either end of the shaft stub. A circle of lugs 52 surround the radial arms 49 in a manner shown at the opposite blade at the bottom of the figure. The shank of the propeller is provided with the same type lugs also indicated at 52 and illustrated in greater detail in Figs. 9 and 10. In addition, the shank of the propeller 9 carries a machined shaft 53 which fits over bearings 51 located on shafts 50. Tension-torsion rods or links 54 are concentrically arranged about the centre shaft in the same manner as shown in Fig. 8 for the rotor and are hooked over the lug projections 52 in the manner shown in Figs. 9 and 10. The control arm 14 is pivotally connected to the far side of the shank of the propeller blade 9 through a pivot 60 and a control post 13 which is rigidly fixed to the shank of the propeller blade at a point outboard of the fittings 52. When push rod 18 is moved co-axially with the propeller shaft it causes collar 17 to slide in and out along the propeller shaft 48. This motion is transmitted through a bearing (not shown in this figure but illustrated at 16 in Fig. 5) to lever 15 which in turn causes the links 14 to move fore and aft substantially co-axially with the propeller shaft. This motion causes a rotation of the propeller blade 9 about the hub shank 49 and shaft portion 50.

The two-bladed propeller arrangement illustrated in Fig. 5 utilizes a slightly different construction than the three-bladed system shown in Fig. 4. It will be noted that the arrangement noted in Fig. 4 is equally applicable to propellers having any number of blades. In Fig. 5 the engine nose section is also shown at 8. The elongated propeller shaft 48 carries a fork yoke member 55 in which are mounted the shanks of the propeller blades 9 at 56 using any suitable bearing between yoke 55 and propeller blade 9, as for example, a bronze bearing, illustrated at 57. It will be noted that the machined shaft portions of the propeller shank ends shown at 58 and 59 are mutually journalled within the bearings 51 which are located at the ends of the over-lapped or telescoped shank ends, thus providing adequate rigidity to assist in taking the bending moments of the propeller blades. The arrangement of the plurality of lugs 52 and the corresponding rods 54 are similar to those shown in Fig. 4 and in detail in Figs. 8, 9 and 10. Thus it will be seen that the blades 9 are free to rotate in the bearings 57 at shank position 56 and that when the blades are rotated in opposite directions the machined shank shaft 58 rotates in relation to machined shank shaft 59 on the interposed bearings 51. The lugs and shaft portions are housed in a suitable fairing 122 for protection and reduction in drag.

It will be further seen that when the blades 9 are rotated in opposite directions, the lugs on the right hand shaft shown at 52 will be rotating in relation to the corresponding lugs 52 shown on the left hand propeller shank. This relative rotation causes the link members 54 to rock about the lug 52 and to have a slope in relation to the centre line passing through the centre of shank members 56 of blades 9. This slope on the link members 54 causes a self-centering between the blades, tending to make them remain at a given pitch angle. The control mechanism shown in Fig. 5 is also similar to the mechanism shown in Fig. 4. For instance, the control posts 13 are fixed to the propeller blades 9 near their shanks and the pivots 60 on the corresponding sides of the shanks such that fore and aft motion of the connecting link 15 causes the blades 9 to turn in their respective pivots 56. The motion of the control link 14 is controlled through the push-pull members 18 and 20, through the lever 19 pivoted at 19a, collar 17, bearing 16 and control arms 15, in a manner as described above.

Fig. 6 shows an assembly elevation of a cutaway section of the rotor hub 2, the extension link 61, rotor blade fork 62, and the blade pitch change operating mechanism, a clarification of this figure being shown also in the plan view of Fig. 7. Hub case 2 carries a cap arm 63 attached to its upper end in which are mounted radial bearing 64 and thrust bearing 65. At the lower end of hub case 2 is an inserted end plate 66 which carries bearing 67 and fixed sheath portion 68 of the Bowden cable 25. The hub shaft 69 rotates in bearings 64, 65 and 67. The bearings 64 and 65 are clamped in place through collar 70 which is threaded on to the rotatable hub shaft 69, the main lift loads being taken through this collar into hub cap 63. The beveled gear 71 is splined to hub shaft 69, and clamping nut 72, which is threaded to shaft 69, maintains gear 71 and bearing 67 in fixed position relative to shaft 69. Within the hollow part of the hub shaft 69 is a mounted stand pipe 82 which is fixed to and sealed with hub end plate 66 and 66a at its lower end. The hub end of cable 25 is fixed in swaged end 75 which is in turn screwed into member 74. Member 74 carries a projecting lug at 73 which moves in a parallel slot 82a in stand pipe 82, thus the assembly of members 74 and 75 and cable 25 are fixed so that they cannot rotate in relation to the hub case 2. Between member 74 and rod 79, bearing 76 is inserted. Nut 81 at the lower end of rod 79 anchors the latter to the inner portion of bearing 76. Just above bearing 76 rod 79 is expanded into a disc 83 to which are attached swaged ends 78 at the end of cables 84, only one of which is shown. In order to cause rod 79 to rotate with hub shaft 69, rod 79 is triangularly shaped in cross section. Guide plate 80 which rotates with hub shaft 69 likewise has a triangularly shaped opening to fit rod 79. By this mating of the two irregular parts, that is section of rod 79 and plate 80, the assembly above bearing 76 rotates with the hub shaft 69. In modifications where it might be desirable to assist the cable 25 in drawing the assembly downwardly within the standpipe 82 to maintain the desired tension in cable 84, a tension spring is preferably attached between the member 74 and the bottom plate 66, or 66a.

Extension links 61 are attached to hub shaft 69 through pivot 85 carrying a droop stop 86 and coning stop 87. On the top of hub shaft 69 are mounted brackets 88, supporting pulley housing 89 which is rockable about pivot 90, pulley 91 being mounted within the rockable pulley bracket 88. The rockable position of pulley housing 89 is determined by the coned position of the blade through the action of the roller 92 and flat surface 93 which moves with the blade. The plate 93, attached to extension arm 61 through clamp structure 94 will cause pulley guard 89 to rotate about pivot 90 carrying pulley 91 along with the guard thereby changing the length of cable 84 to compensate for the normal decrease in the length of this cable which would occur if this compensating device were not incorporated. Pulleys 95 and 96 are also fixedly attached to clamp 94 leading cable 84 out to the blade incidence angle control mechanism without being substantially affected by changes in the coning angle of the blade. Blade fork arm 62 is attached to extension link 61 through vertical hinge 97. A suitable internal self-centering damper is provided, operating on centering cam 98 and limited in its motion by the disappearing stop 99, having its inner telescoping part bearing against lug 61a and the interposed spring 99a as shown in detail in Fig. 11. The tapered pin 99 engaging the portion 62a of the fork arm limits the movement of the latter but when it is desired to fold the blades together the pin is merely pushed in against the spring and rotating the same a quarter turn with a screw-driver, whereby it is locked in its retracted position.

A self-aligning bearing 100 is fitted over the outboard stub end 62a of the fork 62 and within the blade shank 101. The lugs 52 and tension-torsion rods 54 are similar to those described previously, as shown in Figs. 4 and 5, and to be subsequently described in connection with Figures 8, 9 and 10, in that they carry the centrifugal loads between the blade member 101 and the blade fork 62. In flight the rubbing faces 102 between members 62 and 101, are held apart due to the centrifugal load in the blade 1. In this condition of operation, bearing 100 transmits only the shear load resulting from whatever bending there may be in members 62 and 101. When the machine is at rest with the blades drooped in cantilever fashion the upper tension-torsion members 54 transmit the tension part of the bending load introduced by the cantilever blade, and the compression part of this load is transmitted by a contact between the faces 102 between fork 62 and blade shank 101. In practice it has been found desirable to incorporate shims at these surfaces for the purpose of adjustment and control of wear. It may be seen that the blade will be held in cantilever position when stop 86 on extension link 61 droops or rotates downwardly against mating section hub 69.

A better visualization of the arrangement and operation of spring 103 and controlling levers 108, 109 and 110 can be obtained by a study of Figure 7 which is a plan view of the blade root section shown in Figure 6. The pitch control levers 108 and 110 are pivoted at 104 and 105 to the fork 62 and the blade shank 101, respectively, and in conjunction with the interconnecting link 109 pivoted at 106 and 107, a parallelogram linkage is formed. Due to the relative angularity between the pivots 104 and 105 in combination with the parallelogram motion illustrated, blade shank member 101 may be angularly rotated relative to blade fork 62 when cable 84 is lengthened or shortened. From a study of Figs. 6 and 7 it may be seen that arm 108 is pivoted to the fork 62 at a cocked or skewed angle. It will also be seen that when arm 108 is rocked about pivot 104 the outboard end of arm 108 at pivot 106 will be moved up and down relative to the plane of the rotor disc. A double pivot arrangement is provided at the outboard end of lever 108 where it connects to link 109. It will be seen that the pivot at 107 will also move vertically when lever 108 is rocked outboard or inboard. Since link 109 is connected to lever 110 through a self-aligning bearing at pivot 107 it will cause lever arm 110 to move the blade shank 101 as a result of its forked pivot arrangement on blade shank 101 at pivot 105. The cable 84 is also pivotally connected to the pivot 107 by the clevis 118 and the turnbuckle 119. Lever 110 is limited in its outward motion by stop 117 which is adjusted for the highest pitch position of the blade. To the forward end of arm 111 is attached a lead weight 112 which may be made up in parts as desired. This weight arm 111 is attached to lever 110 as though they were a single member so that when lever 110 moves outboard, weight 112 moves inboard. Weight arm 111 and its component weights 112 are used to obtain a proper balance in the system. The effective weight of the lever assembly 108, 109 and 110 with their bearings, etc., is greater than the momentive effect of the weight arm 111 and weights 112, therefore, when the centrifugal tension increases due to increased rotor speed, the assembly of arms 108, 109 and 110 tends to move outboard toward the stop 117 with increasing magnitude according to rotor speed squared.

On the other hand, the spring 103 is swivelled about the pin 116 which passes through pivot 106 at one end, and swivels about adjustable pivot 113 at the other end, the tension in the spring being adjustable at 114. The spring pivot 113 is supported by bracket 115 which is fixed to the fork 62. It will be seen that the spring 103 augmented by tension in cable 84 tends to pull the blade into low pitch position and the centrifugal force acting on the arms 108, 109 and 110 tends to cause the blade to go into its high pitch position. In order to equalize the adjustment in the several blades that may comprise a rotor system, only one of which is shown, the cable 84 is connected to the strap 118 through the adjusting turn-buckle 119. Additional tension in cables 84, as mentioned above, is derived from the tension in cable 25 resulting from the action of the cockpit spring 37 on arms 26 and 27 and attachment 39 of Fig. 2.

In Figure 8 there is shown a section taken through the tension-torsion rod assembly of Figure 7 at lines 8—8 showing the tubular section of fork 62 and the circumferentially arranged tension-torsion rods 54. Figure 9 is an enlarged detail view of the upper left hand lug 52 shown in Figure 6, and a plan view is shown in Figure 10. For each of the tension-torsion rods 54 shown in Figure 8 there is provided a pair of lugs 52, having constant thickness and a flat upper surface, as more clearly shown in Figures 9 and 10. Each of the aforementioned lugs is provided with outwardly opening notches 52a to carry safety retaining wires 121 which keep the tension-torsion rods 54 from moving off of lugs 52. The hardened insert part 120 is fitted into the irregularly shaped slot 54a in rods 54. This insert has a convex surface 120a where it rests against lugs 52, thus when blade shank 101 of Figure 6 is rotated relative to the fork 62 the outboard ends of the tension-torsion rods are rotated with the blade shank 101 while the inboard ends of these rods are held stationary since they are attached to fork member 62. It may readily be seen that when this occurs the tension-torsion rods 54 are rotated or rocked on the lugs 52 and the convex surface of the hardened inserts 120 permit a rocking rather than a sliding motion thereby reducing the friction to a minimum. It may be noted that tension-torsion rods 54 are cut out with an outwardly tapering clearance in the opening 54a to permit the aforementioned rocking motion with assembly housed in a fairing 122.

There are two sources of forces which tend to keep a blade suspended in a given position. The first is the individual twist or torsion introduced in the tension-torsion rods 54 resulting from angular displacement of the blade about its longitudinal axis relative to the fork arm 62 in Figure 6, or shank 49 of Figure 4. This centering force is proportional to the angular displacement of the blade with respect to the hub to which it is linked. The second source of centering of the blade toward the neutral position is brought about when the tension-torsion rods 54 are skewed away from their normal position (parallel with the axis of the blade or blade shank) while centrifugal tension is acting on the blade. In this case the centrifugal forces tend to straighten out or keep the rods parallel to the center line of the blade shank. Any displacement from the parallel position requires that a torsional force be applied to the blade. This force will be proportional to the centrifugal force (R. P. M. squared) and the angular displacement of the blade from its neutral or normal attitude.

In the operation of the jump-take-off control mechanism the engine 8 is started in the usual manner by means of its starter 7 with the rotor clutch 21 disengaged and the handle 24 in its rearward or zero lift position. At the same time, in order that forward motion is not imparted to the craft by the tractor propeller 9, the blades of the latter are adjusted by means of the handle 20a into their zero or lowest pitch position. The rotor system 1 is then started by its starter 6 and its continued rotation is transferred therefrom to the engine 8 by engagement of the clutch 21. The clutch 21 is engaged by rearward and upward movement of the manual handle 23 about the pivot 44 as shown in Figure 3. The resulting rearward movement of the secondary clutch lever 22 and its forked terminal 46 is unimpeded by the stop 45 on the cable 41 inasmuch as the latter is also in its rearward position as determined by the rearward position of the blade pitch control lever 24, the stop 45 having been drawn rearwardly by the tension spring 37. The rearward movement of the stop 45 from a position forward of the lever terminal 46 is permitted due to the correspondingly sloped surfaces 46a and such movement of the stop rearwardly does not interfere either with the released or engaged setting of the clutch lever.

While the engine is running in this manner with both the tractor and lift blade systems rotating, the jump take-off is initiated by pushing the lever 24 forwardly into the high lift position of the rotor blades. At the same time the plunger rod 31 has been drawn downwardly due to the engagement of the enlarged circular section 30 of the slidable plunger 29, with the opening in the tongue 31a such that it may pass freely past the notch 38 in the quadrant 35 on the upward and downward motion of lever 24. The enlarged portion 30 is in engagement with the tongue 31a due to the end of the slidable plunger 29 having engaged the stop 28 in the rearward zero lift position of the handle 24. Likewise, when the hand lever has been moved into its extreme forward or high pitch position the transversely slidable plunger 29 is pushed backwardly and rearwardly as a result of its engagement with the stop 32 in which position the reduced neck portion 33 of the plunger 29 releases the plunger rod 31 to the influence of the tension spring 31b permitting the tongue 31a to latch or lock itself within the notch 38. This causes the concurrent forward movement of the levers 26 and 27 which releases the blade pitch increases tendencies due to slackening of the cable 25 and increased tension in the cable 41 causing the stop 45 thereon to be moved forwardly into the dotted position shown in Figure 3. This forward movement of the stop 45 engages the forked terminal 46 of the lever 22 causing automatic throw-out or release of the clutch 21, simultaneously with the increase in lift of the rotor system. The power developed by the engine now becomes available for forward thrust and when sufficient altitude has been obtained by the lift of the rotor system which rotates for an appreciable period due to the stored energy in the form of inertia, the pitch angle of the propeller blades 9 is increased by operation of the manual control 20a and forward motion of the craft is obtained. The pitch of the rotor blades can then be manually restored to its normal setting by drawing the handle 24 rearwardly until the tongue 31a engages in the notch 39 and the other necessary controls are adjusted for the continued flight of the craft. Since the momental weight of the arms 108, 109, 110, 111, 112 and their assembly is greater on the rearward, or side where the arms are disposed, than on the front or leading side where the weight 112 is located, increasing rotor speed causes said arms to exert an increasing effort to move outboard against the resistance of the spring 103, and the force in the cable 84. On the other hand, as the rotor speed decreases, the force in the cable 84 due to spring 37 combined with the momental force in the spring 103 about pivot 104, including centering effect of the tension-torsion rods, will become greater than the unbalanced centrifugal force (as described above) acting on the assembly of control arms 108, 109, 110, 111, 112. When this occurs spring 37 operating through cable 41 and arm 27 forces lever 24 backwards from the high pitch position. When lever 24 reaches the normal pitch position latch pawl 31a automatically engages notch 39 in quadrant 35. This automatic feature is brought about by the fact that the springs in the system tend to pull the unbalanced weight on the control arms of the blades inboard with a substantially constant force (at any given position of the arms); whereas the centrifugal force acting on the unbalanced moment of said control arms tends to pull the assembly outboard substantially proportional to the rotor speed square. It may readily be seen that at a given rotor speed the blade pitch would be normal, whereas at higher rotor speeds an automatic tendency would be for the pitch of the rotor blades to increase, and at lower than normal speed the automatic tendency would be to lower the pitch angles of the blades.

There are two specific examples in which this automatic adjusting feature of the rotor blade depending upon the rotor speed may be utilized:

(a) In a design of a power driven rotor it may be found desirable to have the rotor blades automatically increase their pitch angle with increasing speeds of the rotor, and conversely to automatically decrease their pitch angle with decreasing speed of the rotor. This can be readily accomplished with the present invention.

(b) Where it is desired to use the kinetic energy of rotor turning at greater than normal speed for increasing the take-off performance of either the power driven or the autorotating type rotor, the system works as follows: With lever 24 in its rearmost position (blades at zero lift), the rotor blades are set in motion either through power from the engine 8 drive shaft, etc., or through an external source of power. It may be noted that the least power is required for turning the blades when they are at their angle of attack of minimum drag (substantially zero lift). In this attitude with a given source of power the blades may be turned to their greatest rotational velocity, which may be much greater than the normal speed of rotation in flight. The speed of rotation which is greater than normal represents stored kinetic energy which can be made available for increasing take-off performance of the machine, which is accomplished as follows:

The over center latch effect of cable 25 below pivot 40 when stop 29 engages stop 28 holds lever 24 in its rearmost position, as the speed of the rotor increases the unbalanced moment of the assembly of the control arms 108, 109, 110, 111 and 112 creates an increasing unbalanced centrifugal force acting on said arms which is carried through cable 84 and units 76, 77; bearing 78; case 74, and part 75 to cable 25. Thus when lever 24 is pushed forward to the extent that cable 25 passes about pivot 40, the increased force in cable 25 will immediately force lever 24 to its most forward position, shown in dash lines on Figure 2. If a limitation is desired to reduce the rapidity with which the pitch angles are increased, a suitable dash pot or damper cylinder 26b, may be pivotally connected at 39 in Fig. 2 or may be inserted anywhere in the system at which it will retard the forward motion of cable 25.

When the blades are in their high pitch position the aerodynamic drag on the blades is increased and the tendency is to rapidly slow down the rotational speed of the rotor. When the speed of the rotor is slowed down, as mentioned above, the force of the springs acting on levers 108, 109, 110 tends to pull them inboard and adjust the pitch to a lower angle of incidence, thus the system operates automatically.

It will be seen from the foregoing that suitable means has been provided for permitting angular adjustment of the blades of both the tractor propeller and rotating wing system, in relation to the axis of rotation of either without the development of appreciable friction while the centrifugal forces are acting upon the blades. This has been accomplished by transferring the centrifugal tension, in the case of the rotor system, from the blade 101 to the fork arm 62 through the plurality of rods 54. Because of the convex surface 120a on the insert 120, which fits in the slotted portion 54a of the ends of the rods 54, the motion between each rod and its mating lug 52 as shown in detail in Figs. 9 and 10, is a rocking motion rather than a sliding motion and therefore the only friction present is due to rolling friction which is obviously extremely small. In addition the small bearing 100 mounted internally at the outboard connection of the rods 54 develops an extremely small amount of friction inasmuch as it transmits only the shear load from the blade 101 to the forked arm 62. The self-centering effect which is obtained by this construction also causes relatively high torsional frequencies of the blade and thereby permits successful feather control installations. The foregoing features of my invention are relatively important in that a means has been found for permitting adjustment of the blade pitch while under centrifugal tension, but without introducing appreciable friction into the system; and also in that the construction shown for making blade incidence adjustments can be made much lighter than prior arrangements and methods which involve the use of thrust bearings and the like.

Other advantages and modifications of the present invention which may occur to one versed in the art, both in general arrangement and detail design, are all intended to fall within the scope and spirit of this invention.

I claim:

1. In an aircraft sustaining rotor having a hub and an autorotative blade, a link member pivotally mounted upon said hub at its inner terminal and having a transversely apertured outer terminal, fork means associated with the said blade pivoted to said outer terminal adapted to permit blade movement within its plane of rotation, and stop means carried by said link outer portion on each side thereof in the path of said blade fork adapted normally to limit said blade movement about said outer terminal, the said stops being retractable within said link for blade folding about said outer pivot.

2. In rotative wing aircraft, a variable pitch blade, a support member adapted for the pivotal attachment of said blade to the aircraft, bearing means journalling said blade to said member for pitch adjustments of the blade with respect to said member about their common axis, a link pivoted to said support member on a skewed axis, a second link pivoted to said blade on an axis normal to said blade axis, a third link pivotally interconnecting the free outer terminals of said first two links and cable means connected to the pivotal connection of the last two said links adapted when tensioned to change the angular disposition of the assembly of said three links and thereby impart rotation to said blade with respect to its co-axial journal upon said support member for control of blade pitch adjustments.

3. In rotative wing aircraft, a variable pitch blade, a support member adapted for the pivotal attachment of said blade to the aircraft, bearing means journalling said blade to said member for pitch adjustments of the blade with respect to said member about their common axis, a link pivoted to said support member on a skewed axis, a second link pivoted to said blade on an axis normal to said blade axis, a third link pivotally interconnecting a free outer terminal of said first two links, said links forming a parallelogram arrangement in which rotation of said first link about its skewed axis causes blade pitch rotation with respect to said support member and cable means connected to one of said outer pivoted connections adapted to impart movement in said parallelogram linkage and relative axial movement of said blade and its support member for blade pitch adjustment.

4. In rotative wing aircraft, a rotatable hub assembly, a rotatable blade system, link means pivotally connecting said blades to the rotatable portion of said hub assembly, bearing means between each said blade and its said link for pitch adjustment, cable means extending from the body of said aircraft to each of said blades for manual pitch adjustment thereof, and cable coupling means disposed within said hub assembly for connecting the rotatable blade portions of said cables to the non-rotatable manually operated control cable portion, the said coupling means comprising an internally splined tubular element fixed to the aircraft, a terminal for said non-rotatable cable reciprocally engaging said splined portion and having an internal bore, and a rotatable terminal element journalled in an antifriction bearing within said bore and having said blade cable portions attached thereto.

5. In rotative wing aircraft, a plurality of rotatable blades, a hub assembly having a tubular central portion for the rotational support of said blades, a link member pivotally carried by said hub assembly for limited vertical movement about a horizontal pivot, a blade connecting member adapted to interconnect said link member with one of said blades, said link member having a vertical pivot to which the inner end of said connecting member is pivoted for limited movement within its plane of rotation, the said blade being co-axially journalled for limited blade pitch adjustment with respect to said connecting member, cable means for the manual adjustment for the pitch of each of said blades passing through said tubular hub portion, and a shaft for said cable means pivotally supported upon said hub assembly and rockably engaging a portion of said link member, said shaft rocking in response to pivotal movements of said link member with respect to said hub assembly about said horizontal pivot whereby changes in cable tension are automatically compensated for to permit blade pitch adjustment in all positions of blade pivotation.

6. In an aircraft sustaining rotor having a hub and an autorotative blade, a link member pivotally mounted upon said hub at its inner terminal and having an apertured outer terminal, an arm associated with the said blade pivotally engaging said outer terminal adapted for blade pivotation in its plane of rotation, and stop means carried on each side of said link outer portion normally disposed in the path of said blade pivotal movement, the said stop means being manually retractable within said linked portion for blade folding about said outer pivot.

RICHARD H. PREWITT.